United States Patent [19]

Doi et al.

[11] Patent Number: 5,433,266
[45] Date of Patent: Jul. 18, 1995

[54] VEHICLE AIR-CONDITIONING APPARATUS

[75] Inventors: Shigetoshi Doi, Iwakuni; Eiji Ukita, Higashi-Hiroshima; Hiroshi Asou, Hiroshima; Yasuhiro Enno, Higashi-Hiroshima; Takashi Tsuchida; Toshikazu Ishikawa, both of Hiroshima, all of Japan

[73] Assignees: Mazda Motor Corporation; Naldec Corporation, both of Hiroshima, Japan

[21] Appl. No.: 128,284

[22] Filed: Sep. 29, 1993

[30] Foreign Application Priority Data

Sep. 30, 1992 [JP] Japan .................. 4-261437

[51] Int. Cl.⁶ .................................... F25B 29/00
[52] U.S. Cl. .................... 165/29; 62/238.6; 62/323.1; 165/30; 165/48.1; 237/2 B
[58] Field of Search ............... 165/14, 16, 17, 29, 165/30, 32, 39, 40, 48.1, 58; 62/238.6, 238.7, 323.1, 323.2; 237/2 B

[56] References Cited

U.S. PATENT DOCUMENTS

| | | | |
|---|---|---|---|
| 4,112,705 | 9/1978 | Sisk | 165/29 |
| 4,187,687 | 2/1980 | Savage | 237/2 B |
| 4,346,755 | 8/1982 | Alley | 165/29 |
| 4,479,365 | 10/1984 | Holmes | 62/238.6 |
| 4,553,401 | 11/1985 | Fisher | 237/2 B |
| 4,569,207 | 2/1986 | James | 62/238.6 |
| 4,614,090 | 9/1986 | Kaneko | 62/238.6 |

FOREIGN PATENT DOCUMENTS

| | | |
|---|---|---|
| 3610962 | 6/1990 | Germany . |
| 4119042 | 12/1991 | Germany . |
| 4121124 | 1/1992 | Germany . |
| 57-77216 | 5/1982 | Japan . |
| 62-8327 | 2/1987 | Japan . |

Primary Examiner—Ira S. Lazarus
Assistant Examiner—Daniel J. O'Connor
Attorney, Agent, or Firm—Keck, Mahin & Cate

[57] ABSTRACT

The present invention relates to an air-conditioning apparatus provided in an vehicle. The apparatus is adapted to deliver conditioned air into a passenger compartment so as to regulate an interior temperature of a passenger compartment at a desired temperature. The apparatus comprises a temperature regulating device for regulating an outlet air temperature, a blower, and a controller for setting a target outlet air temperature and volume. The controller includes comfortability index setting means for setting a comfortability index which is a function of at least an outlet air temperature and volume and which is an indication representing a degree of a passenger's comfort, a variable temperature setting device located in the passenger compartment for a manual presetting of a desired interior temperature, and variable target setting means for setting a target value of the comfortability index dependent on the preset interior temperature, and air temperature and volume setting means for setting a combination of said target outlet air temperature and volume which allows the comfortability index to be approximated to the target value thereof.

20 Claims, 10 Drawing Sheets

Tr: INTERIOR TEMP.
Ta: AMBIENT AIR TEMP.
Ts: SOLAR RADIATION-TEMP.
Te: COOLING COIL OUTLET TEMP.
Tw: COOLING WATER TEMP.
θ: AIR MIX DAMPER OPENING
TSET: MANUAL PRESET TEMP.

VEHICLE AIR-CONDITIONING APPARATUS

BACKGROUND OF THE INVENTION

The present invention generally relates to an air-conditioning apparatus for a vehicle, and more specifically, to such an air-conditioning apparatus provided in an vehicle and adapted to deliver conditioned air into a passenger compartment so as to regulate an interior or room temperature of the passenger compartment at a desired temperature.

Many Vehicles are equipped with heater-air-conditioner systems. Such heater-air-conditioner systems are generally well-known as an apparatus for heating, cooling or dehumidifying air in the passenger compartment of a vehicle. The heater-air-conditioner systems generally comprise a temperature regulating means constituted so as to control the heat balance between a heat-exchange capacity of the system and a heat load imposed thereon in order to maintain the passenger compartment of the vehicle at a desired comfortable temperature.

For example, the heat balance during cooling operation can be defined by the following formula:

$$Qa = Qu - Qs - Qm - Qe \qquad (1)$$

wherein Qa is the heat-exchange capacity of the heater-air-conditioner system, Qu is a transmission loss due to the temperature differential between the ambient temperature and the passenger compartment temperature, Qs is a heat load caused by the solar radiation, Qm is a heat load dissipated from the human bodies of passengers, and Qe is a heat load dissipated from equipments in the vehicle, such as an internal-combustion engine. Further, Qa, Qu, Qs are given by the following expressions:

$$Qa = Cp \cdot \gamma \cdot Va(To - Tr)$$

$$Qu = K \cdot A(Tr - Ta)$$

$$Qs = Ks \cdot Ts$$

wherein
- Va: Outlet Air Volume of Blower (Delivery Air Volume of Blower);
- To: Outlet Air Temperature of Heater-Air-Conditioner System;
- Tr: Interior Temperature of Passenger Compartment
- Ta: Ambient Air Temperature (Outdoor Air Temperature)
- Ts: Reduced Temperature of Solar Radiation
- Cp: Specific heat of air at constant pressure
- γ: Specific Gravity of air
- K: Overall Heat Transfer Coefficient
- A: Heating Surface Area
- Ks: Conversion Coefficient for Converting Solar Radiation to Temperature.

In the above-mentioned formula (1), assuming Qm, Qe to be C (constant) since Qm and Qe can be considered as being approximately constant values, the expression (1) can be rewritten into the following expression:

$$CP \cdot \gamma \cdot Va(To - Tr) = K \cdot A(Tr - Ta) - Ks \cdot Ts - C \qquad (2)$$

If the room temperature Tr is substantially equal to a preset temperature TSET which is manually set by the passenger, this expression can be further rewritten into the following expression:

$$Cp \cdot \gamma \cdot Va(To - TSET) = K \cdot A(TSET - Ta) - Ks \cdot Ts - C \qquad (3)$$

Thus, the desired values of the outlet air volume Va and the outlet air temperature To can be obtained from the above-mentioned expression (3), and the outlet air volume Va and the outlet air temperature To of the heater-air-conditioner system is converged to the desired values, respectively, whereby the room temperature Tr can be maintained substantially at the preset temperature TSET. However, the above-mentioned expression includes two variables, that is, the outlet air volume Va and the outlet air temperature To, and therefore, it is difficult to obtain the really desired values of the volume Va and the temperature To directly or uniformly from the above expression (3).

In a heater-air-conditioner system disclosed in Japanese Patent Publication No. 62-8327 (Application No. 54-57215), the relationship between the outlet air volume and an environmental condition such as the ambient air temperature is predetermined, and the outlet air volume is determined in accordance with a detected environmental condition. Then, a desired outlet air temperature is computed from the determined outlet air volume, and the opening degree of an air-mixing door or damper is controlled so as to obtain the outlet air temperature.

Further, Japanese Patent Application Laid-Open Publication No. 57-77216 (Application No. 55-153718) discloses a heater-air-conditioner system in which an optimum outlet air temperature can be determined in accordance with a preset desired room temperature, a detected ambient air temperature and a detected room temperature.

In the system disclosed in the above-mentioned Japanese Publication No. 62-8327, an intended outlet air volume may be controlled, but the outlet air temperature has to be uncontrollable. On the contrary, according to the system disclosed in Japanese Laid-Open Publication No. 57-77216, an intended outlet air temperature may be controlled, but the outlet air volume has to be uncontrollable.

In particular, since a passenger in a vehicle tends to take a position relatively near to air outlets of a heater-air-conditioner system, an excessively high or low outlet air temperature or an excessively high or low outlet air flow rate gives an uncomfortability to the passengers, and therefore, the system cannot satisfy passengers' requests for comfortable air condition. Further, the temperature actually sensed by the passenger relates to both the outlet air volume and the outlet air temperature. If one of them is preferentially controlled but the other is uncontrollable, the temperature actually sensed by the passengers may be often deviated from their desired temperature.

Accordingly, one object of the present invention is to provide a vehicle air-conditioning apparatus in which both the outlet air temperature and the outlet air volume can be set so as to satisfy a passenger's comfort. Another object of the present invention is to provide a vehicle air-conditioning apparatus which can compensate the individual difference in comfortability of the passengers.

SUMMARY OF THE INVENTION

The foregoing and other objects and advantages are attained, according to the present invention, by an air-conditioning apparatus for a vehicle comprising:

a temperature regulating device for regulating a temperature of air to be delivered to a passenger compartment, so that an interior air temperature is regulated at a desired temperature;

a blower for making the air pass through said temperature regulating device and flow out into the passenger compartment; and control means for setting a target outlet air temperature and a target outlet air volume of the apparatus;

wherein said control means includes comfortability index setting means for setting a comfortability index which is a function of operating conditions including at least an outlet air temperature and an outlet air volume and which is an indication representing a degree of a passenger's comfort;

a variable temperature setting device which is located in the passenger compartment in order for the passenger to manually preset a desired interior temperature;

variable target setting means for setting a target value of the comfortability index dependent on the interior temperature preset by the variable temperature setting device; and air temperature and volume setting means for setting a combination of said target outlet air temperature and said target outlet air volume which allows the comfortability index to be approximated to the target value set by said variable target setting means.

Preferred embodiments of the invention may have the following additional features, either alone or in combination:

(1) The comfortability index is calculated by the following formula:

$$F = K1 \cdot Va + K2 \cdot To + K3 \cdot Ta + K4 \cdot Tr + K5 \cdot Ts$$

wherein the element Va is the outlet air volume, the element To is the outlet air temperature, the element Ta is an ambient air temperature, the element Tr is an interior air temperature in the passenger compartment, the element Ts is a temperature which is converted from a solar radiation value, and K1 through K5 are weighting coefficients for the respective elements;

(2) The target value of the comfortability index is defined by the following formula:

$$FTSET = A + (TSET - B)/3$$

wherein FTSET is the target value of the comfortability index, TSET is the interior temperature preset by means of said variable temperature setting device, and the values A, B are predetermined values;

(3) The control means includes first computing means for computing the optimum outlet air temperatures and the optimum outlet air volumes for maintaining the interior temperature at the preset interior temperature, second computing means for computing said comfortability indices based on the optimum outlet air temperatures and the optimum outlet air volumes obtained by the first computing means, selecting means for selecting as the target outlet air temperature and volume a combination of the optimum outlet air temperature and the optimum outlet air volume which allows the comfortability index to be approximated to said target value, and operation control means for controlling the outlet air temperature through said regulating device and the air volume from said blower so as to bring them into accord with said selected combination;

(4) The control means stepwisely varies the outlet air volume from its minimum value up to its maximum value, and computes the outlet air temperatures suitable for the respective outlet air volumes and the comfortability indices based on respective combinations of the outlet air volume and the outlet air temperature.

BRIEF DESCRIPTION OF THE DRAWINGS

The above and other objects, advantages and novel features of the present invention will be made more fully apparent from a reading of the following detailed descriptions taken in conjunction with the accompanying drawings in which.

DESCRIPTION OF THE PREFERRED EMBODIMENT

Figure 1:
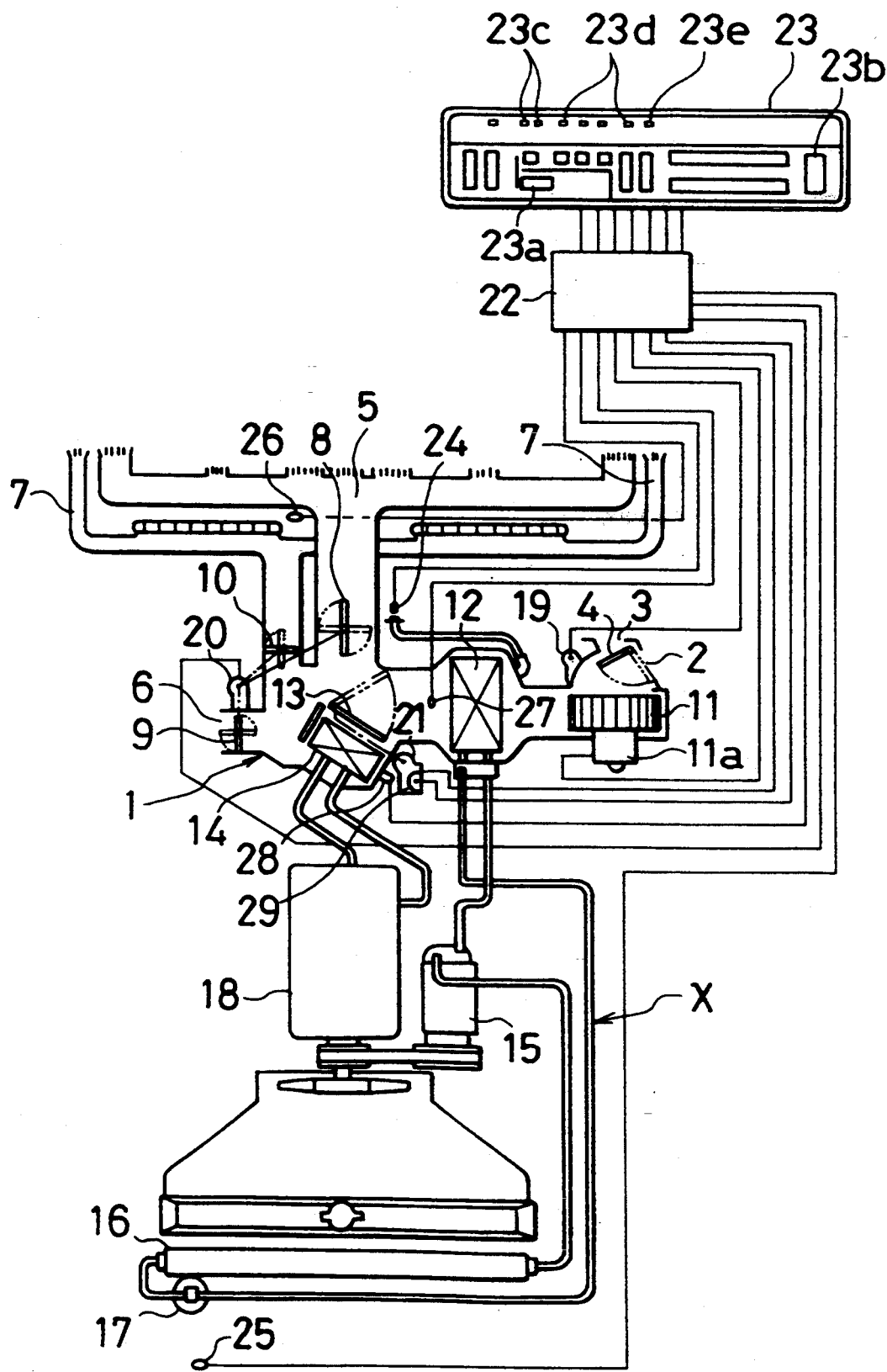
FIG. 1 is a schematic view showing the overall arrangement of the vehicle heater-air-conditioner system of the embodiment according to the present invention.

A preferred embodiment according to the present invention will be described in detail hereinbelow.

The present inventors have created a comfortability index as a generic indication incorporating heating-air-conditioning factors such as the ambient air temperature, the interior temperature, and the solar radiation, and accordingly have proposed in Japanese Patent Application No. 3-170015 a vehicle air-conditioning apparatus in which the operating conditions can be set in accordance with this comfortability index. In this air-conditioning apparatus, both of the outlet air temperature and the outlet air volume are determined so that the comfortability index, which is set totally in consideration with various kinds of heating-air-conditioning factors, is coincident with or is approximated to a predetermined value. Then, a blower and a mixing door or damper in the air-conditioning apparatus are controlled in order to regulate the outlet air temperature and the outlet air volume.

In this embodiment, the degree of comfortability sensed by the passenger is indicated by a comfortability index F which can be mathematically calculated from heating-air-conditioning factors (outlet air temperature To and outlet air volume Va) and environmental factors (ambient air temperature Ta, interior temperature Tr and solar radiation value Ts).

The comfortability index F can be calculated by the following formula which has been obtained by evaluation tests:

$$F = K1 \cdot Va + K2 \cdot To + K3 \cdot Ta + K4 \cdot Tr + K5 \cdot Ts \quad (4)$$

wherein K1 through K5 are weighting coefficients for the respective elements. The values of factors K1 to K5 includes two sets of factors K1 to K5, one set being for the comfortability index F2 which are mainly used in the summer season (during cooling operation), and the other set being for the comfortability index F4 which are mainly applied in the winter season (during heating operation). The values of those sets are different from each other, since the difference between the air distribution pattern in cooling operation and the air distribution pattern in heating operation is deemed to be important.

The comfortability index F, in which the passenger feels relatively cold, is set to be "1", and the comfortability index F, in which the passenger feels relatively hot, is set to be "9". The comfortability index F, wherein the passenger generally feels comfortable, is set to be an optimum value such as "5". The above-mentioned factors K1 to K5 are experimentally determined so that the comfortability index F, with which the passenger senses the most comfortable condition, results in the optimum value "5". Thus, as the comfortability index F increases, for example, in the comfortability index F=7 to 9, an atmosphere is indicated in which the passenger senses a hotter condition. On the other hand, as the comfortability index decreases, for example, in the comfortability index F=1 to 3, an atmosphere is indicated in which the passenger senses a colder condition.

However, if the optimum value of the comfortability index is fixed at a constant value, it cannot meet or compensate the difference in sense of comfortability or in feeling of the passengers owing to the difference among individuals, geographical differences, climatic differences or the like. Therefore, in this embodiment, the above-mentioned optimum value is set to be a variable index FTSET which is defined by a function of a preset temperature TSET. The temperature TSET is able to be manually set by the passenger, and therefore, the passenger can control the value FTSET at the desire of the passenger. In this embodiment, the function FTSET may be defined to results in the above-mentioned optimum value "5" when the passenger sets his desired temperature at 25 deg. C.

Figure 2:
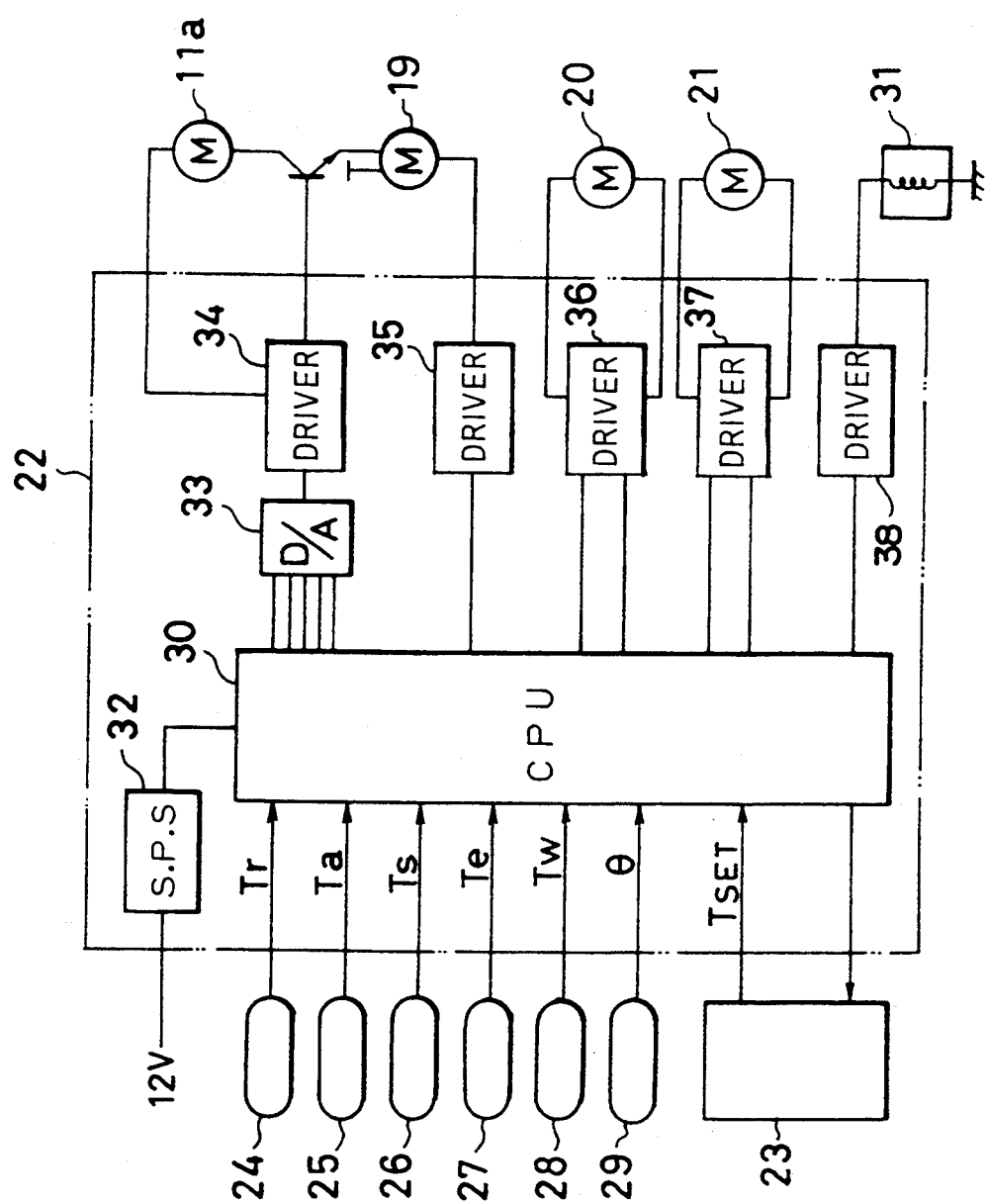
FIG. 2 is a diagrammatic view showing the entire arrangement of the controller.
Figure 3:
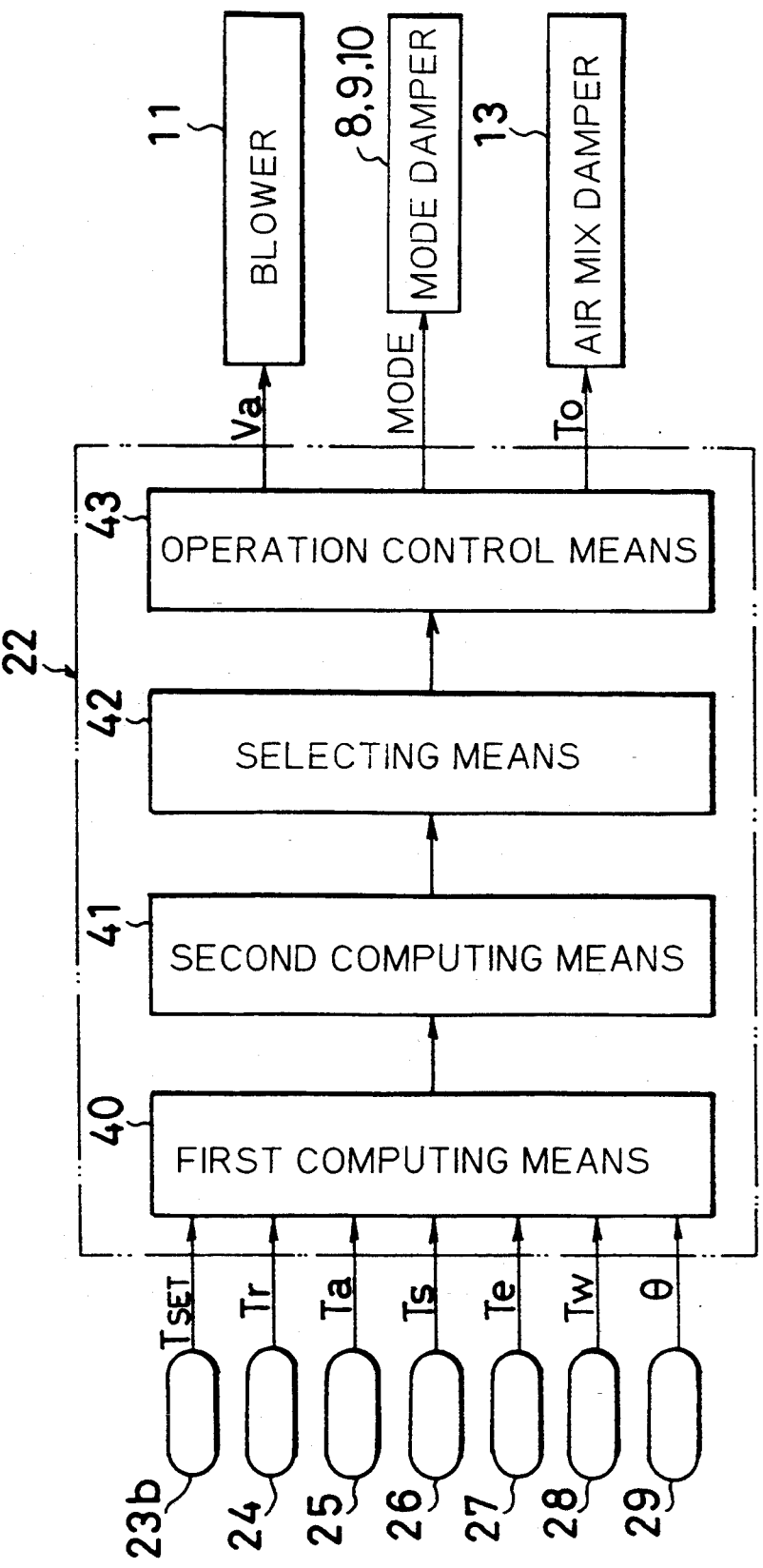
FIG. 3 is a diagrammatic view functionally showing the arrangement of the controller.

Detailed explanation will be hereinafter made of the structure and function of the vehicle heater-air-conditioner system with reference to the attached drawings. In FIGS. 1 through 3, there is illustrated a heater-air-conditioner system for a vehicle in accordance with one embodiment of the present invention. FIG. 1 is a schematic view showing the arrangement of the vehicle heater-air-conditioner system.

Referring to FIG. 1, the heater-air-conditioner system comprises a ventilation duct 1, an outside air intake 2 for introducing outdoor fresh air in an upstream part of the duct 1, an interior air intake 3 for introducing recirculation air in the upstream part of the duct 1, and outside air change-over door or damper 4 for selectively controlling the opening and closing of the air intakes 2, 3. Further, the downstream part of the ventilation duct 1 is provided therein with a vent outlets 5, a foot outlets 6 and a defroster outlets 7, and three mode change-over doors or dampers 8, 9, 10 for selectively directing conditioned air to the outlets 5, 6, 7 therethrough.

A blower 11 of variable volume type is disposed in the upstream part of the ventilation duct 1, so that intake air introduced through the interior air intake 3 and/or the outside air intake 2 flows-out into the passenger compartment through the duct 1 and the outlets 5, 6, 7 by means of an action of the blower 11.

The system further includes a cooling heat-exchanger 12 and a heating heat-exchanger 14, which are disposed in series in the ventilation duct 1. The cooling heat-exchanger 12 is disposed downstream of the blower 11 and the heating heat-exchanger 14 is disposed downstream of the cooling heat-exchanger 12. The cooling heat-exchanger 12, which is a cooling coil, is connected to a coolant circuit X including a compressor 15, a condenser 16 and a receiver 17, so that the heat-exchanger 12 serves as an evaporator. The compressor 15 is selectively connected or disconnected to a rotary element of an internal-combustion engine 18 in accordance with ON/OFF operation of an electromagnetic clutch. Further, the heating heat-exchanger 14 is arranged to be a heater core through which coolant or cooling water from an engine cooling system of the engine 18 is circulated. The flow of the cooling water fed to the heating heat-exchanger 14 is controlled by a flow control valve, which is not shown, so as to be regulated in association with an air-mixing door or damper 13.

The air mixing damper 13 is disposed between the cooling heat-exchanger 12 and the heating heat-exchanger 14 so that the air flow through the heating heat-exchanger 14 is controlled by the opening position of the air mixing damper 13, which can be moved to allow full air flow, or no air flow, or any position in between. Therefore, the mixing ratio of the air flow to be heated through the heating heat-exchanger 14 with respect to the air flow bypassing the heat-exchanger 14 is adjusted. The opening degree $\theta$ of the air mixing damper 13 is indicated by "1" when the entire air flow passes through the heating heat-exchanger 14, that is, when the rate of air flow passing through the heating heat-exchanger 14 is 100%, whereas the opening degree $\theta$ is indicated by "0" if the entire air flow bypasses the heating heat-exchanger 14, that is, if the rate of air flow passing through the heating heat-exchanger 14 is 0%. The outlet air temperature To is determined by the above-mentioned mixing ratio, and therefore, it can be steplessly adjusted between the highest temperature obtained in a case of the opening degree $\theta = 1$ and the lowest temperature obtained in the opening degree $\theta = 0$.

The opening degree $\theta$ of the above-mentioned air-mixing damper 13 is defined by the following formula:

$$\theta = (T_o - T_e)/(K_w \cdot T_w - T_e) \tag{5}$$

wherein
- Te: Outlet Air Temperature of Cooling Heat-Exchanger 12;
- Tw: Engine Cooling Water temperature;
- Kw: Coefficient for Converting Engine Cooling Water Temperature into Outlet Air Temperature of Heating Heat-Exchanger 14.

The system further comprises motors, which serve as devices for driving the above dampers, that is, an electric motor 19 for moving the interior air/outside air change-over damper 4, an electric motor 20 for moving the mode change-over dampers 8, 9, 10, and a servo-motor 21 for moving the air mixing damper 13. Further, the system includes control means for controlling the operation of the system, that is, a controller 22 for controlling the above-mentioned motors 19, 20, 21 and the output air volume of the blower 11, and a control panel 23 for manually setting air-conditioning factors. The control panel 23 is provided with various switches, adjusters and the like which can be manipulated by the passenger, such as an automatic switch 23a for selecting either of an automatic air-conditioning control mode or a manual air-conditioning control mode, an interior temperature setting adjuster 23b for manually setting the interior temperature TSET at a desired value, an interior and outside air adjuster 23c for manually setting the introduction rate of interior air and outside air, and a airflow mode switch 23d for selecting an airflow mode, and a defroster adjuster 23e for manually setting the opening degree of the defroster outlet 7. The interior temperature setting adjuster 23b may be a digital push switch which allows the passenger to stepwisely increase or decrease a desired interior temperature, e.g., in the order of every 0.5 deg. C, or a slide adjuster of variable resistor type which allows linear setting of a desired interior temperature.

FIG. 2 is a diagrammatic view showing the arrangement of the controller 22.

In this embodiment, a microcomputer incorporating CPU, RAM, ROM and the like is used as the controller 22. The controller 22 has a microprocessor (which will be hereinbelow denoted as "CPU") 30 is connected to a stabilized power supply (S.P.S) 32, and is adapted to drive the above-mentioned motors 19, 20, 21 by means of drivers 35 to 37 and to control the engagement and disengagement of the electromagnetic clutch 31 incorporated between the compressor 15 and the engine 18 by means of a driver 38. Under the control of the motors 19, 20, the airflow mode of the system is changed or maintained, and under the control of the servomotor 21, the opening degree $\theta$ of the air mixing damper 13 is adjusted.

The control device 22 drives a blower motor 11a through a D/A converter 33 and a driver 34, and under the control of voltage applied to the blower motor 11a, the delivery air volume of the blower 11, which substantially corresponds to the air volume Va, is controlled.

Further, the system comprises various kinds of sensors for detecting environmental conditions, such as an interior temperature sensor 24 for detecting the temperature of recirculated air sucked into the ventilation duct 1 as being the interior temperature Tr, an outside temperature sensor 25 for detecting the ambient air temperature Ta, a solar radiation sensor 26 for detecting the solar radiation value, a duct sensor 27 for detecting the outlet temperature Te of the cooling heat-exchanger 12, a water temperature sensor 28 for detecting the temperature of engine cooling water, and a potentiometer 29 for detecting the opening degree $\theta$ of the air mixing damper 13.

FIG. 3 is a diagrammatic view functionally showing the arrangement of the controller 22.

The control device 22 is provided with a first computing means 40 receiving detection signals delivered from the above-mentioned sensors 24 to 29 and the signals from the switches or adjusters 23a to 23e on the control panel 23. The first computing means 40 computes basic parameters (To, Va) for maintaining the interior temperature Tr at the preset temperature TSET, according to a correlation between the outlet air temperature To and the outlet air volume Va. This correlation between the temperature To and the volume Va is defined by the above-mentioned thermal balance expression (3), that is, $[C_p \cdot \gamma \cdot Va (To - TSET) = K \cdot A (TSET - Ta) - K_s \cdot T_s - C]$.

The control device 22 further comprises a second computing means 41 for computing the above-mentioned comfortability index F $[= K_1 \cdot Va + K_2 \cdot To + K_3 \cdot Ta + K_4 \cdot Tr + K_5 \cdot T_s]$, a selecting means 42 for determining the outlet air temperature To and the outlet air volume Va so that the comfortability index F obtained by the second computing means 41 can be most approximated to its optimum value FTSET, and an operation control means 43 for controlling the opening degree $\theta$ of the air mixing damper 13 and the voltage applied to the blower 11 in accordance with the temperature Ta and the volume Va which are determined by the selecting means 42.

Explanation will be made in respect of the control mode of the system in this embodiment with reference to FIGS. 4 to 10.

Figure 4:
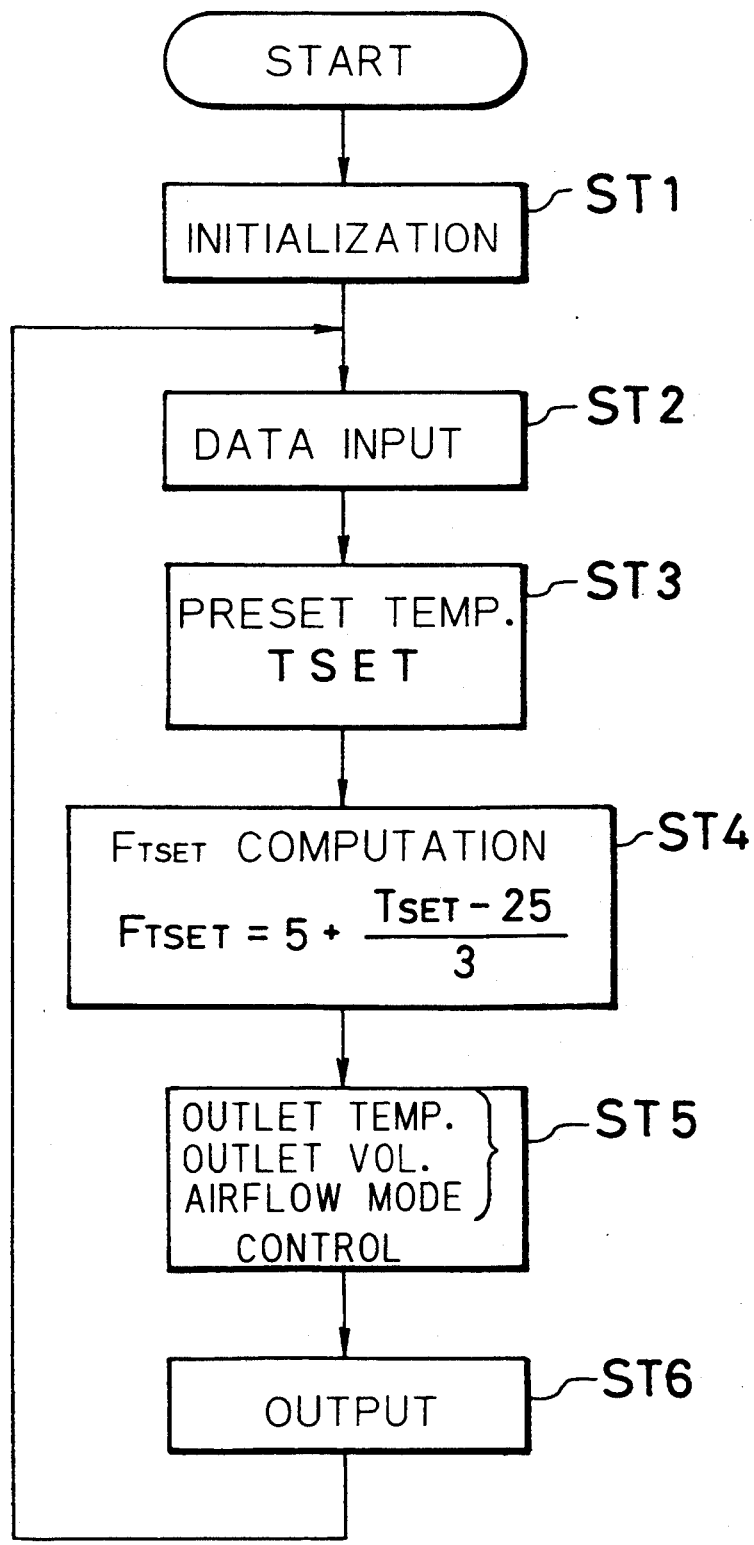
FIG. 4 is a flow-chart showing a basic flow of heating-air-conditioning control carried out by the controller.

FIG. 4 is a flow-chart showing a basic flow of the air-conditioning control carried out by the control device 22. After initial setting (step ST1), the controller 22 reads results detected by the sensors 24 to 29 (ST2). Further, the control device 22 computes a target value FTSET of the comfortability index F, based on the interior temperature TSET preset by the passenger through the interior temperature setting adjuster 23b (ST3 and ST4). This target value FTSET can be obtained by the following formula:

$$FTSET = 5 + (TSET - 25)/3 \tag{6}$$

It can be readily understood from the formula (6) that the target value FTSET corresponds to the value "5" when the preset temperature TSET is 25 deg. C. Then, the controller 22 sets the outlet air temperature To and the outlet air volume Va in such a manner that the comfortability index F is coincident with or is approximated to the target value FTSET. Further, the controller 22 sets the opening degree $\theta$ of the air-mixing damper 13 and the voltage applied to the blower 11 (ST5), sets an airflow mode which is appropriate for the outlet air temperature To and volume Va (ST5), and then, outputs them so as to allow a desired operation of the system (ST6).

Figure 5:
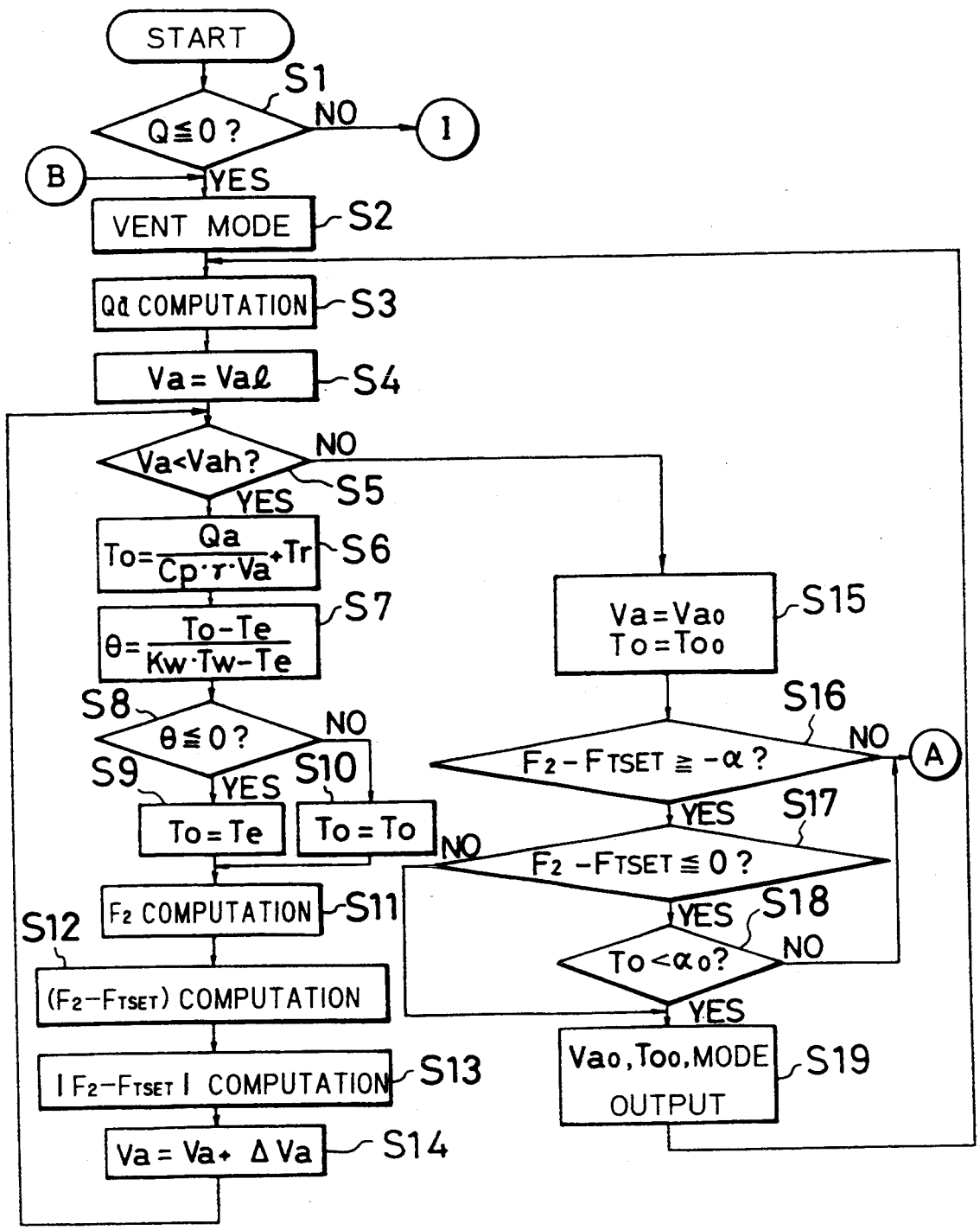
FIG. 5 is a flow-chart showing a routine for setting an outlet air temperature and an outlet air volume in vent mode.

FIG. 5 is a flow-chart showing a routine for setting the outlet air temperature To and the outlet air volume Va in vent mode, and setting an airflow mode.

At first, it is determined whether the heat load Q $[= K \cdot A(Tr - Ta) - K_s \cdot T_s - C]$ of the passenger compartment is positive or negative (Step S1). It is understandable from the heat load formula that, if $Q<0$ is presented, the vehicle is in an environmental condition in which a cooling operation is required, and if $Q>0$ is presented, the vehicle is in an environmental condition in which a heating operation is required.

If $Q<0$ is confirmed, the control device 22 assumes the vent mode in which only the mode damper 8 is opened (S2), and computes a required heat-exchange capacity Qa $[=K \cdot A(TSET-Ta)-Ks \cdot Ts-C+Ki(TSET-Tr)]$ for bringing the interior temperature Tr into accord with the preset temperature TSET (S3), wherein Ki is the thermal capacity of the vehicle body. Thereafter, through steps S4 to S14, the outlet air volume Va is stepwise increased each time when a predetermined air flow increment $\Delta$ Va is added (S14), so that it varies from its minimum air volume Val to its maximum air volume Vah. The outlet air temperature To, the opening degree $\theta$ of the air mixing damper 13, the comfortability index F2 in a cooling operation, (F2−FTSET) and |F2−FTSET| are computed in accordance with every outlet air volume Va (S6 to S13).

The stepwise setting of the outlet air flow Va (S5, S14), the computation of the outlet air temperature To $[=(Qa/Cp \cdot \gamma \cdot Va)+Tr]$ (S6), and the computation of the opening degree $\theta$ $[=(To-Te)/(Kw \cdot Tw-Te)]$ of the air mixing damper (S7) are carried out by the first computing means 40 in the controller 22. If the first computing means 40 defects $\theta \leq 0$ (the flow through the heating heat-exchanger $14 \leq 0\%$) (S8) through the computation of the opening degree $\theta$ (S7), this means that the required outlet temperature To is limited by the capability of the cooling heat-exchanger 12. Therefore, the first computing means 40 sets the outlet air temperature To to be the outlet temperature Te of the cooling heat-exchanger 12 (S9). On the other hand, if the first computing means 40 detect $\theta > 0$ (the flow through the heating heat-exchanger $14 > 0\%$) (S9), this means that the cooling heat-exchanger 12 can afford to cool the air below the required outlet temperature To. The first computing means 40 sets the temperature To to be the outlet air temperature To which has been calculated at step S6 (S10).

The second computing means 41 of the control device 22 computes the comfortability index F2 $(=K1 \cdot Va+K2 \cdot To+K3 \cdot Ta+K4 \cdot Tr+K5 \cdot Ts)$, (F2−FTSET) and |F2−FTSET|, on the basis of the outlet air volumes Va and temperatures Ta obtained by the above-mentioned steps, the ambient air temperature Ta detected by the ambient air temperature sensor 25, interior temperature Tr detected by the interior temperature sensor 24 and the converted temperature value Ts of the solar radiation detected by the solar radiation sensor 26 (S11, S12, S13). Thus obtained results of the computation are stored respectively in RAMs incorporated in the controller 22.

Further, the control means 22 selects a combination (Va0, To0) of the outlet air volume Va and the outlet air temperature To, which can minimize a magnitude of |F2−FTSET|, by means of the selecting means 42 (S15). Thereafter, the control device 22 determines suitability of the mode setting, i.e., whether the airflow mode has been appropriately set (S16 to S18). As regards the suitability of the mode setting, if the controller 22 detects (F2−FTSET)$\geq$a predetermined value $-\alpha$ (for example, $\alpha=0.9$) (S16) and also (F2−FTSET)$>0$ (S17); otherwise, if it detects To0 < predetermined value $\alpha 0$ (for example, $\alpha 0=30$ deg. C) (S18), it determines that the setting of the present airflow mode i.e., vent mode is appropriate.

Then, the controller 22 allows the operation control means 43 to adjust the output air volume of the blower 11 and the opening degree $\theta$ of the air mixing damper 13 so as to set the air volume, Va and the outlet air temperature To to be the air volume Va0 and the output air temperature To0, respectively. Further, the controller 22 allows the operation control means 43 to set the mode dampers 8, 9, 10 at predetermined positions so as to provide the airflow of vent mode and maintain it (S19).

Meanwhile, in a case of detecting (F2−FTSET)< the predetermined value $-\alpha$ (for example, $\alpha=0.9$) (S16), or in a case of detecting (F2−FTSET)$\leq 0$ and To0$\geq \alpha 0$ (S17, S18), it is considered that the passenger has a sense of coldness in the upper part of his body, or the passenger has a sense of hotness in the upper part of his body due to excessively high outlet air temperature, and therefore that the setting of vent mode is inappropriate. Accordingly, the controller 22 shifts the procedure into a B/L mode setting routine as shown in FIG. 6 (S16, S18).

Figure 6:
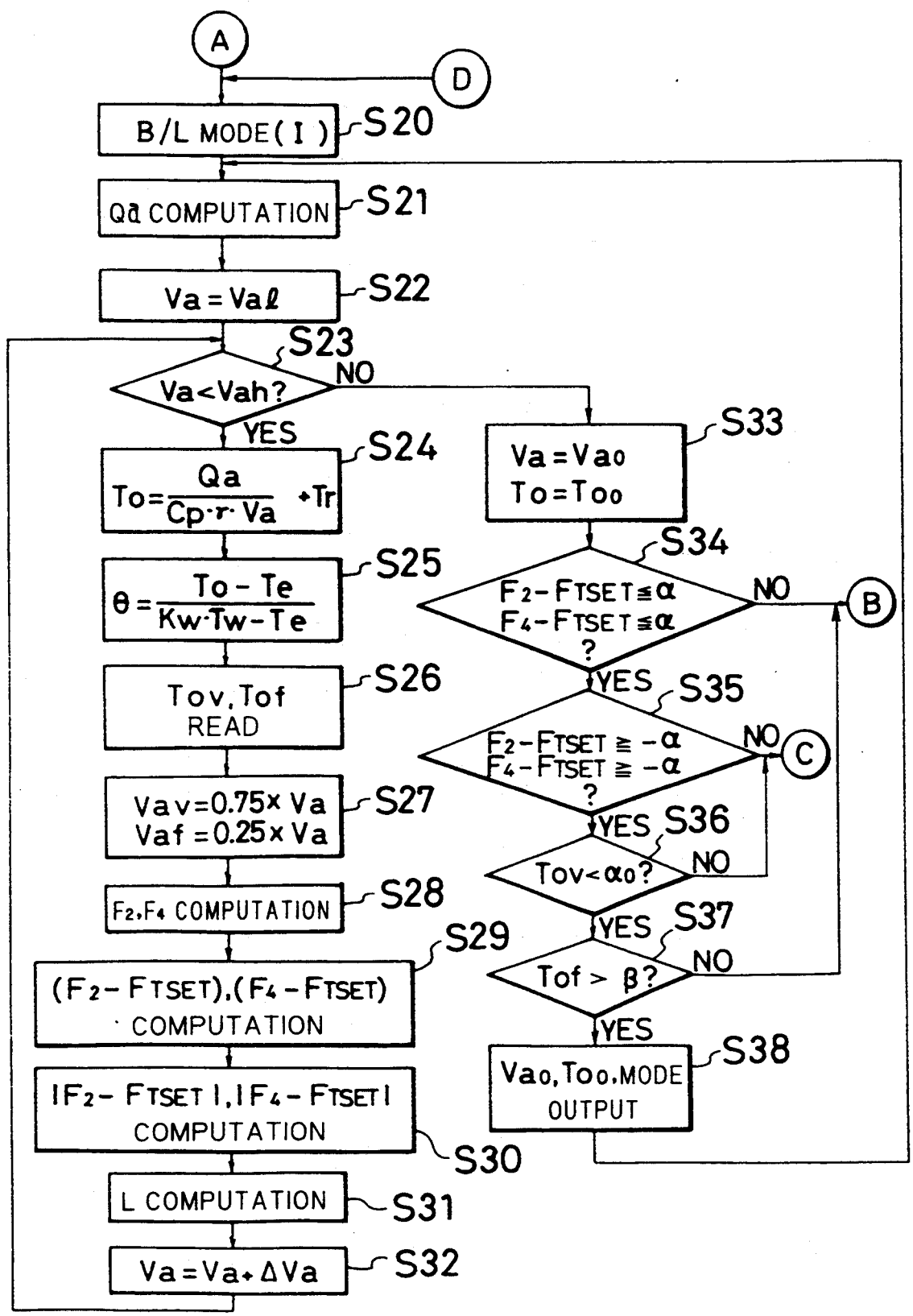
FIG. 6 is a flow-chart which shows a routine for setting an outlet air temperature and an outlet air volume in B/L mode (I)
Figure 7:
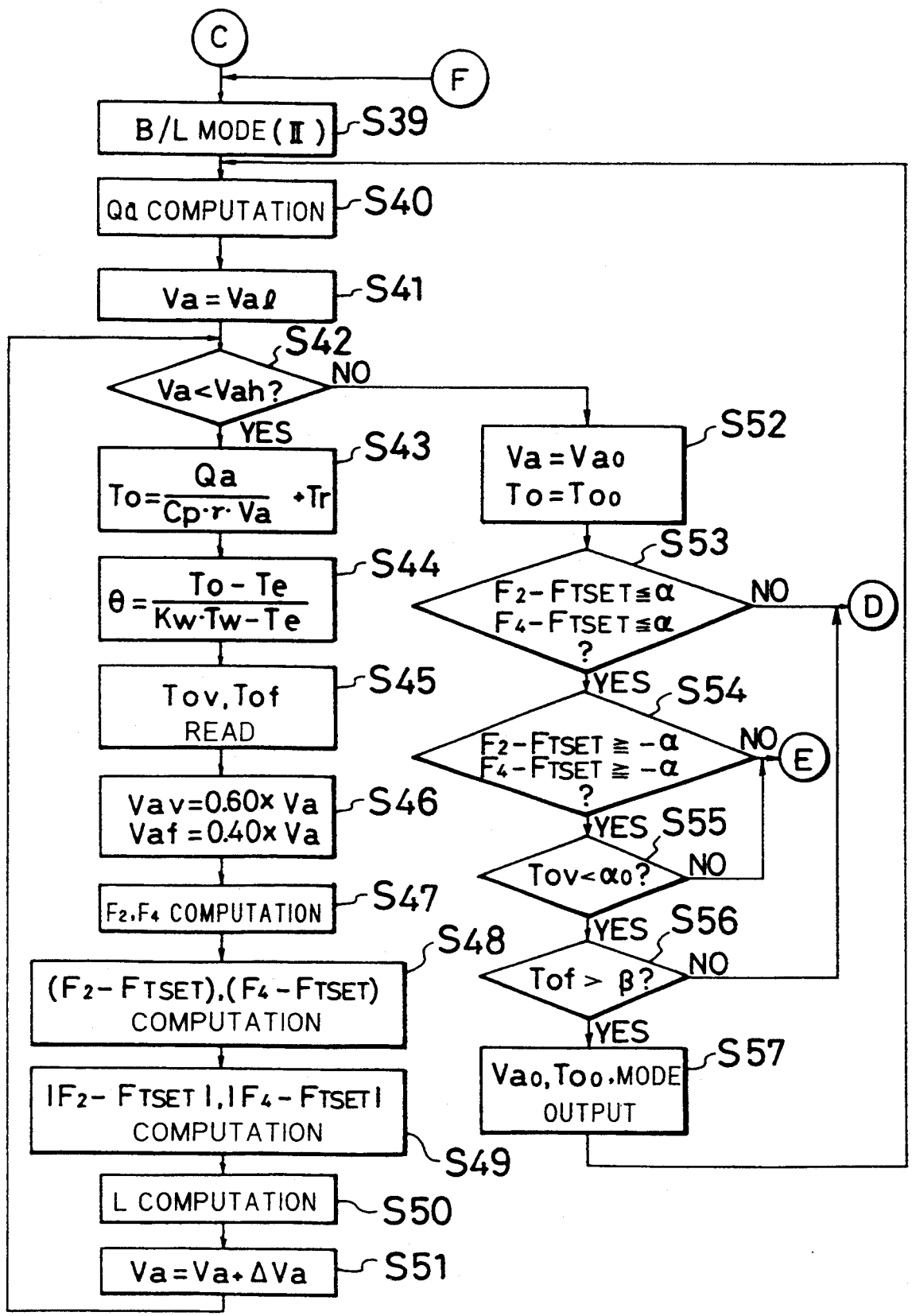
FIG. 7 is a flow-chart which shows a routine for setting an outlet air temperature and an outlet air volume in B/L mode (II)
Figure 8:
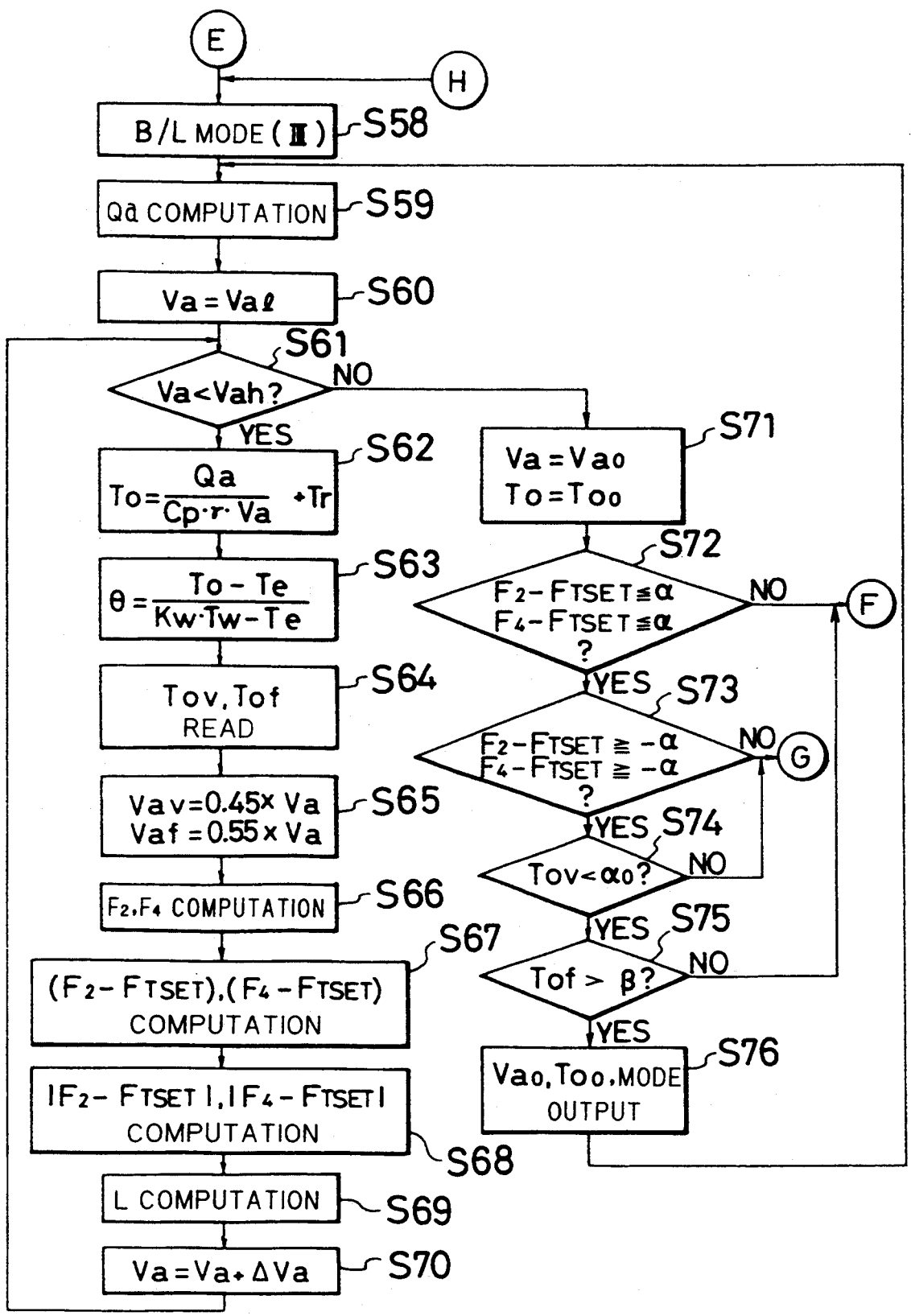
FIG. 8 is a flow-chart which shows a routine for setting an outlet air temperature and an outlet air volume in B/L mode (III)

FIGS. 6 to 8 are flow-charts which show the setting routines for the outlet air temperature To and volume Va in the B/L mode, and the setting of airflow mode.

In the B/L mode, conditioned air is blown off from both of the vent outlet 5 and the foot outlet 6. This B/L mode is subdivided into three different modes, that is, B/L mode (I), B/L mode (II) and B/L mode (III) in which the rates between the outlet air volume of the vent outlet 5 and that of the foot outlet 6 are different from each other. The rates of outlet air volumes in these three B/L modes are as follows:

B/L mode (I): 75% at the vent outlet 5 and 25% at the foot outlet 6;

B/L mode (II): 60% at the vent outlet 5 and 40% at the foot outlet 6; and

B/L mode (III): 45% at the vent outlet 5 and 55% at the foot outlet 6.

In FIG. 6, the controller 22 estimates the B/L mode (I) (S20) and computes the heat-exchange capacity Qa. That is, the controller 22 carries out the computation of the heat-exchange capacity Qa $[=K \cdot A(TSET-Ta)-Ks \cdot Ts-C+Ki(TSET-Tr)]$ (S21), and effects stepwise setting of the outlet air volume Va from the minimum or lowest air volume Val to the maximum or highest air volume Vah (S22 to S32). The controller 22 computes the optimum outlet air temperatures To, opening degrees $\theta$ of the air mixing damper 13, outlet air temperatures Tov at the vent outlet 5, outlet air temperatures Tof at the foot outlet 6, outlet air volumes Vav $(=0.75 \times Va)$ from the vent outlet 5 and outlet air volumes Vaf $(=0.25 \times Va)$ from the foot outlet 6, corresponding to the respective air volumes Va which are stepwisely set (S24 to S27). The stepwise setting of the outlet air volume Va, and the computation of the air temperature To, the opening $\theta$, the air temperatures Tov, Tof and the air volumes Vav, Vaf are carried out by the first computing means 40.

Based on the air temperatures Tov, Tof, Ta, Tr, air volumes Vav, Vaf, and value Ts, the controller 22 computes two comfortability indices F2, F4 relating to the air volumes Vav, Vaf set at each loop (S28), and then computes (F2−FTSET), (F4−FTSET), |F2−FTSET| and |F4−FTSET| (S28 to S30) by means of the second computing means 41. The comfortability index F2 is substantially identical with the comfortability index F2 in the vent mode. It is computed with use of the outlet air temperature Tov, the outlet air volume Vav, and the weighting elements K1 to K5 which have been predetermined for an airflow from the vent outlet 5. The comfortability index F4 is computed from the air temperature Tof, the air volume Vaf and the weighting elements K1 to K5 which have been predetermined for an airflow from the foot outlet 6.

The controller 22 obtains a reference value L according to the following formula (S31):

$$L^2 = (F2 - FTSET)^2 + (F4 - FTSET)^2$$

Figure 10:
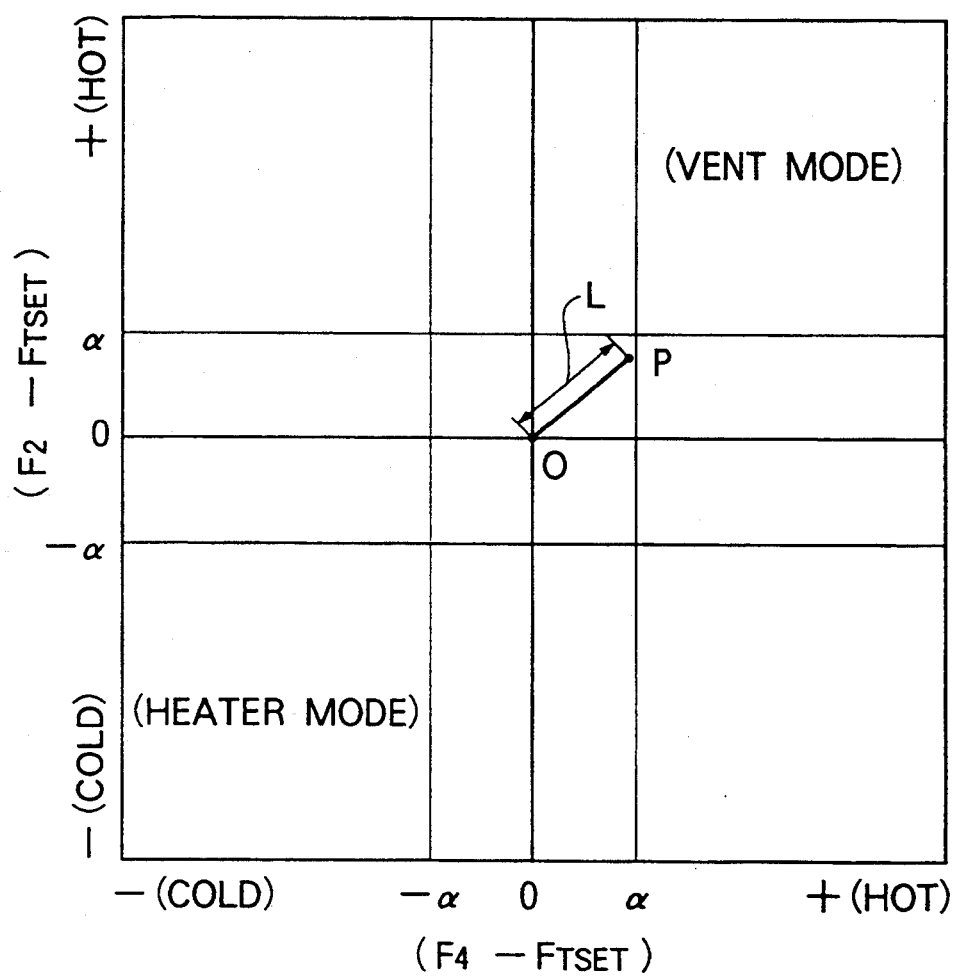
FIG. 10 is graphical representation which shows a relationship between comfortability indices and a reference value.

The value L represents a distance between the target value FTSET and a generic comfortability index defined by the two comfortability indices F2, F4, as shown in FIG. 10. The selecting means 42 selects the combination (To0, Va0) of the air volume Va and the air temperature To, which minimizes the value L (S33). Further, the controller 22 determines whether the present airflow mode is appropriate or not (S34 to S37). If it is detected that the estimated mode, that is, the B/L mode (I) is appropriate, the mode dampers 8, 9, 10 are shifted to the predetermined positions and keep the airflow of the B/L mode (I). Further, the output air volume of the blower 11 and the opening degree $\theta$ of the air mixing damper 13 are adjusted so as to provide the combination (Va0, To0) of the air volume Va and the air temperature To selected as mentioned above (S38).

Whereas, if it is detected that the selection of the B/L mode (I) is improper, the controller 22 transfers to the routine (FIG. 5) for the above-mentioned vent mode or a routine (FIG. 7) for the B/L mode (II).

FIG. 7 is a flow-chart which shows the B/L mode (II) routine for setting the outlet air temperature To, the outlet air volume Va. In this routine, the rates of the air volumes Vav, Vaf from the vent outlet 5 and the foot outlet 6 are set to 60% and 40%, respectively. Accordingly, the air volume Vav from the vent outlet 5 is obtained from a formula Vav=0.60·Va, and the air volume Vaf from the foot outlet 6 is obtained from Vaf=0.40·V. The other control operations are performed substantially in the same way as in the B/L mode (I), and therefore, further explanation thereto is omitted. If the controller 22 detects mode (II) routine that the setting of the B/L mode (II) is inappropriate, it transfers to the routine for the B/L mode (I) (FIG. 6) or to a routine for the B/L mode (III) (FIG. 8).

FIG. 8 is a flow-chart which shows the B/L mode (III) routine for setting the outlet air temperature To and the outlet air volume Va. In this routine, the rates of the air volumes Vav, Vaf from the vent outlet 5 and the foot outlet 6 are set to 45% and 55%, respectively. Accordingly, the air volume Vav from the vent outlet 5 is obtained from Vav=0.45·Va, and the air volume Vaf from the foot outlet Vaf is obtained from Vaf=0.55·V. The other control operations or arrangements are substantially the same as those in the B/L mode (I) or in the B/L mode (II). Accordingly, further explanation thereto is omitted. The controller 22 detects in the B/L mode (III) routine that the selection of the B/L mode (III) is inappropriate, it transfers to the B/L mode (I) routine in (FIG. 7) or a routine in a heater mode (FIG. 9).

Figure 9:
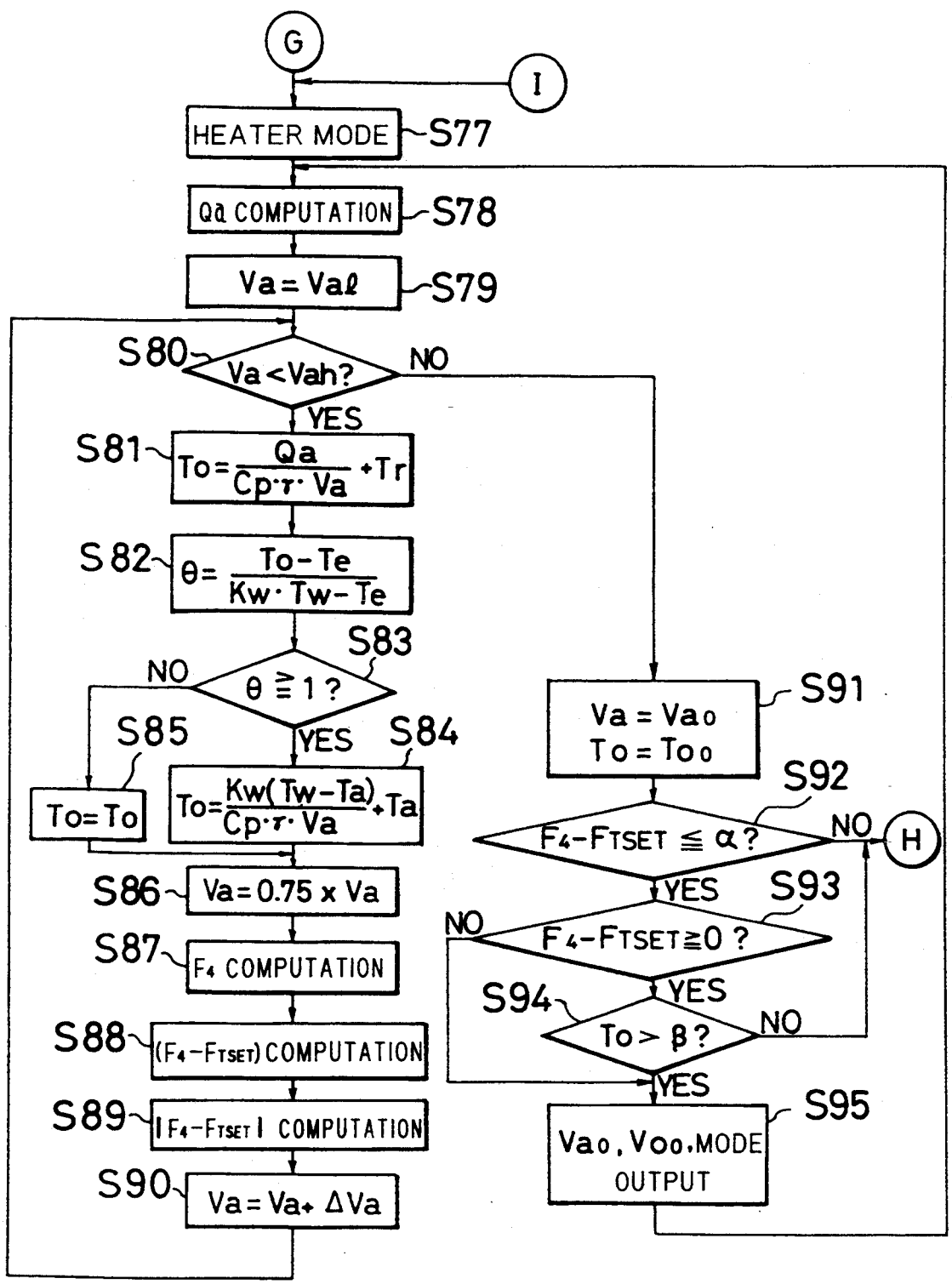
FIG. 9 is a flow-chart which shows a routine for setting an outlet air temperature and an outlet air volume in heater mode.

FIG. 9 is a flow-chart which shows the heater mode routine for setting the outlet air temperature To and the outlet air volume Va.

The controller 22 carries out the heater mode routine in a case where it transfers thereto from the B/L mode (III) routine (FIG. 7), and also, in a case where the controller 22 detects in the vent mode routine (FIG. 5) that the heat load Q in the passenger compartment is positive (Q>0) (S1), i.e., the vehicle is in an environmental condition which requires heating.

The controller 22 estimates the heat mode in which 75% of the outlet air volume is blown off from the foot outlet 6 and 25% of the outlet air volume is blown off from the defroster outlet 7 (S77), and computes a thermal heat-exchange capacity Qa [=K·A(TSET—Ta)—Ks·Ts—C+Ki (TSET—Tr)] (S78), which is required for keeping the passenger compartment temperature Tr at the preset temperature TSET. Thereafter, the controller 22 stepwisely increases the air volume Va in each loop wherein the predetermined air volume increment $\Delta$ Va is added to the volume Va. Therefore, the air volume Va varies from the minimum air volume Va1 to the maximum air volume Vah. At the same time, it computes the index F4, (F4—FTSET) and |F4—FTSET|, based on each air volume Va set at each loop, and computes an optimum outlet air temperature To and an optimum opening degree $\theta$ of the air mixing damper 13, corresponding to each air volumes Va respectively (S80 to S90).

The steppedly setting of the air volume Va (S80, S90), the computation of the air temperature To [=Qa/Cp·$\gamma$·Va+Tr] (S81), and the computation of the opening degree $\theta$ [=(To—Te)/(Kw·Tw—Te)] of the air mixing damper 13 (S82) are carried out by the first computing means 40 in the controller 22. At the step S82, the first computing means 40 set the outlet air temperature To to the outlet air temperature To calculated at the step 881, if the controller 22 detects $\theta < 1$ (S83) (the air volume through the heating heat-exchanger 14<100%). Whereas, if Q≧1 (the air volume through the heating heat-exchanger 14≧ 100%) is detected, this means that the heating heat-exchanger 14 cannot afford heating the air up to the required outlet temperature To. Therefore, the first computing means 40 uses the resultant value of the formula: To=[Kw (Tw—Ta)/Cp·$\gamma$·Va+Ta] so as to set the air temperature To to be the outlet air temperature of the heating heat-exchanger 14 (S84).

The control device 22 also sets the outlet air volume Va to be 0.75·Va (S87) since the rate of the air volume from the foot outlet 6 is 75%, and computes the comfortability index F4 [=K1·Va+K2·To+K3··Ta+K4·Tr+K5·Ts], (F4—FTSET) and |F4—FTSET| in accordance with the air volume Va, the above-mentioned computed air temperature To, the ambient air temperature Ta detected by the ambient air temperature sensor 25, the interior temperature Tr detected by the interior temperature sensor 24, and the solar radiation temperature value Ts detected by the solar radiation sensor 16 (S87, S88, S89). The computation of the comfortability index F4, (F4—FTSET) and |F4—FTSET| is carried out by the second computing means 41. The results of the computation are read in RAMs incorporated in the control circuit 22.

Further, the controller 22 selects the combination (Va0, To0) of the air volume Va and the air temperature to which minimizes |F4—FTSET| by means of the selecting means 42 (S91), and determines whether the present mode selection i.e., heater mode is appropriate or not. Further, it adjusts the output air volume of the blower 11 and the opening degree $\theta$ of the air mixing damper 13 so as to regulate the air volume Va and the air temperature To to the above-mentioned air volume Va0 and the air temperature To0 (S92 to S95).

As regards the above-mentioned mode selection, the controller 22 determines that the selection of the heater mode is appropriate, in a case of (F4−FTSET)≦α (S92), and (F4−FTSET)<0 (S93) or To0> a predetermined value β (for example, β=20 deg. C) (S94). In this case, the controller 22 adjusts the output air volume of the blower 11 and the opening degree θ or the air mixing damper 13 through the operation control means 43. Further, the controller 22 shifts the mode dampers 8, 9, 10 to the predetermined positions and maintains the dampers at these positions in order to set and maintain the airflow of the heat mode.

On the other hand, if determination is made as (F4−FTSET)> the predetermined value α (for example, α=0.9) (S92), or determination is made as Ta0<β (S94), it is considered that the passenger senses hotness of his lower body, or the passenger senses coldness of his lower body due to the excessive low outlet air temperature, and therefore, the selection of the heater mode is inappropriate. Thus, the controller 22 transfers to the B/L mode (III) routine as shown in FIG. 8 (S92, S94).

According to the heater-air-conditioner system as described above, the system comprises the cooling and heating heat exchangers 12, 14, the blower 11 and the controller 22. The controller 22 sets a comfortability index F which is calculated by the following formula obtained by evaluation tests:

$$F = K1 \cdot Va + K2 \cdot To + K3 \cdot Ta + K4 \cdot Tr + K5 \cdot Ts$$

wherein K1 through K5 are weighting coefficients for the respective elements. The controller 22 can determine both the outlet air temperature Ta and the outlet air volume Va in such a manner that the index F is coincident with or is approximated to the target value FTSET, which is a variable index defined by a function of a preset temperature TSET. Therefore, the system can set both the outlet air temperature To and the outlet air volume Va so as to satisfy a passenger's comfort and compensate the individual difference in comfortability of the passengers.

While the present invention has thus been shown and described in connection with a particular preferred embodiment, it is apparent that certain changes and modifications, in addition to those mentioned above, may be made by those skilled in the art without departing from the basic features of the present invention. Accordingly, it should be noted that the present invention is in no way limited to the details of the described arrangements.

What is claimed is:

1. An air-conditioning apparatus for a vehicle comprising:
    a temperature regulating device for regulating a temperature of air to be delivered to a passenger compartment, so that an interior air temperature is regulated at a desired temperature;
    a blower for making the air pass through said temperature regulating device and flow out into the passenger compartment; and
    control means for setting a target outlet air temperature and a target outlet air volume of the apparatus;
    wherein said control means includes comfortability index setting means for setting a comfortability index which is a function of operating conditions including at least an outlet air temperature and an outlet air volume and which is an indication representing a degree of a passenger's comfort;
    a variable temperature setting device which is located in the passenger compartment in order for the passenger to manually preset a desired interior temperature;
    variable target setting means for setting a target value of the comfortability index dependent on the interior temperature preset by the variable temperature setting device; and
    air temperature and volume setting means for setting a combination of said target outlet air temperature and said target outlet air volume which allows the comfortability index to be approximated to the target value set by said variable target setting means.

2. An apparatus according to claim 1, wherein said comfortability index is set to be a greater value under a condition where the passenger feels relatively hot than a value which it is set to under a condition where the passenger feels relatively cold, and the target value of the comfortability index is set to be a value intermediate between said values.

3. An apparatus according to claim 2, wherein said comfortability index is set to be at least a sum of a weighted value of the outlet air volume and a weighted value of the outlet air temperature.

4. An apparatus according to claim 3, wherein said comfortability index is calculated by the following formula:

$$F = K1 \cdot Va + K2 \cdot To + K3 \cdot Ta + K4 \cdot Tr + K5 \cdot Ts$$

wherein the element Va is the outlet air volume, the element To is the outlet air temperature, the element Ta is an ambient air temperature, the element Tr is the interior air temperature in the passenger compartment, the element Ts is a temperature which is converted from a solar radiation value, and K1 through K5 are weighting coefficients for the respective elements.

5. An apparatus according to claim 4 further comprising an interior temperature sensor for detecting the interior air temperature of the passenger compartment, an outside temperature sensor for detecting the ambient air temperature, and a solar radiation sensor for detecting the solar radiation value.

6. An apparatus according to claim 1, wherein said target value of the comfortability index is a function of the interior temperature preset by said variable temperature setting device, and this function is defined so that the target value is increased as the preset interior temperature is increased.

7. An apparatus according to claim 6, wherein said function for said target value is defined by the following formula:

$$FTSET = A + (TSET - B)/3$$

wherein FTSET is the target value of the comfortability index, TSET is the interior temperature preset by means of said variable temperature setting device, and the values A, B are predetermined values.

8. An apparatus according to claim 7, wherein said variable temperature setting device is an interior temperature adjuster which allows setting of the temperature by the passenger and which is disposed on an instrument panel of the passenger compartment.

9. An apparatus according to claim 1, wherein said temperature regulating device includes a heating heat-exchanger and a cooling heat-exchanger, said blower is a variable volume blower, and an air mixing damper is disposed in a ventilation duct so that the damper can control a mixing ratio of an airflow through the cooling heat-exchanger and an airflow through the heating heat-exchanger.

10. An apparatus according to claim 9, wherein said control means includes mode changing means for changing a mode of an airflow pattern directed to the passenger compartment on the basis of the outlet air temperature.

11. An apparatus according to claim 9, wherein said control means includes mode changing means for changing a mode of an airflow pattern directed to the passenger compartment on the basis of a difference between the comfortability index and the target value thereof.

12. An apparatus according to claim 4, wherein said coefficients K1 to K5 includes a first set of coefficients K1 to K5 for a cooling operation and a second set of coefficients K1 to K5 for a heating operation, said sets of coefficients K1 to K5 being different from each other.

13. An apparatus according to claim 12, wherein said control means computes a first comfortability index based on said first set of coefficients K1 to K5 for the cooling operation and a second comfortability index based on said second set of coefficients K1 to K5 for the heating operation, and selects a combination of the outlet air volume and the outlet air temperature which can minimize a difference between the first comfortability index and said target value thereof and a difference between the second comfortability index and said target value thereof.

14. An apparatus according to claim 1, wherein said control means includes first computing means for computing the optimum outlet air temperatures and the optimum outlet air volumes for maintaining the interior temperature at the preset interior temperature, and second computing means for computing said comfortability indices based on the optimum outlet air temperatures and the optimum outlet air volumes obtained by the first computing means.

15. An apparatus according to claim 14, wherein said control means further includes selecting means for selecting as the target outlet air temperature and volume a combination of the optimum outlet air temperature and the optimum outlet air volume which allows the comfortability index to be approximated to said target value, and operation control means for controlling the outlet air temperature through said regulating device and the air volume from said blower so as to bring them into accord with said selected combination.

16. An apparatus according to claim 1, wherein said control means stepwisely varies the outlet air volume from its minimum value up to its maximum value, and computes the outlet air temperatures suitable for the respective outlet air volumes and the comfortability indices based on respective combinations of the outlet air volume and the outlet air temperature.

17. An apparatus according to claim 16, wherein said control means selects a combination of the outlet air volume and the outlet air temperature which can minimize a difference between the comfortability index and said target value of the comfortability index, and set the resultant combination as a combination of a target outlet air temperature and volume.

18. An apparatus according to claim 17, wherein said control means has means for assuming an airflow mode, which is defined by an airflow pattern directed to the passenger compartment, and means for determining whether the assumed mode is suitable for the selected combination of the outlet air volume and the outlet air temperature.

19. A vehicle having a heater-air-conditioner system which comprises:
an air cooling system driven by an internal-combustion engine and a heater core through which engine coolant is circulated;
a blower for making the air pass through a cooling coil of said air cooling system and said heater core;
a control panel for manually presetting a desired interior temperature; and
a controller for setting a target outlet air temperature and a target outlet air volume;
wherein said controller includes comfortability index setting means for setting a comfortability index which is a function of at least an outlet air temperature and an outlet air volume and which is an indication representing a degree of a passenger's comfort;
variable target setting means for setting a target value of the comfortability index dependent on the interior temperature preset by the control panel; and
air temperature and volume setting means for setting a combination of a target outlet air temperature and a target outlet air volume so that the resultant combination can minimize a difference between the comfortability index obtained by said comfortability index setting means and the target value thereof set by the variable target setting means.

20. A vehicle according to claim 19, wherein an air mixing damper is disposed in a ventilation duct in which the damper can control a mixing ratio of an airflow through said cooling coil and an airflow through the heater core, and the opening of the damper is set by the following formula:

$$\theta = (To - Te)/(Kw \cdot Tw - Te)$$

wherein To is the outlet air temperature, Te is an outlet air temperature of the cooling coil, Tw is an engine coolant temperature, and Kw is a coefficient for converting the engine coolant temperature into an outlet air temperature of the heater core.

* * * * *